US012609523B2

(12) United States Patent
Sullivan et al.

(10) Patent No.: US 12,609,523 B2
(45) Date of Patent: Apr. 21, 2026

(54) APPARATUS FOR PROTECTING MOTORS

(71) Applicant: Mark Sullivan, Houston, TX (US)

(72) Inventors: Mark Sullivan, Houston, TX (US);
Michael Gordon, Pittsburg, KS (US)

(73) Assignee: Mark Sullivan, Houston, TX (US)

( * ) Notice: Subject to any disclaimer, the term of this patent is extended or adjusted under 35 U.S.C. 154(b) by 170 days.

(21) Appl. No.: 18/480,878

(22) Filed: Oct. 4, 2023

(65) Prior Publication Data

US 2024/0120730 A1    Apr. 11, 2024

Related U.S. Application Data

(60) Provisional application No. 63/378,408, filed on Oct. 5, 2022.

(51) Int. Cl.
*H02H 7/08*     (2006.01)
*H02H 1/00*     (2006.01)
*H02J 9/06*     (2006.01)

(52) U.S. Cl.
CPC ............ *H02H 7/08* (2013.01); *H02H 1/0007* (2013.01); *H02J 9/06* (2013.01)

(58) Field of Classification Search
CPC .................................. H02H 7/08; G05B 19/42
See application file for complete search history.

(56) References Cited

U.S. PATENT DOCUMENTS

| | | | | |
|---|---|---|---|---|
| 2008/0277945 A1* | 11/2008 | Lorenz | .................. | H02J 7/0031 |
| | | | | 307/64 |
| 2011/0031810 A1* | 2/2011 | Bright | ....................... | H02J 3/38 |
| | | | | 307/51 |
| 2014/0015324 A1* | 1/2014 | Brennan | ................. | H02J 3/381 |
| | | | | 307/72 |

* cited by examiner

*Primary Examiner* — Karen Masih
(74) *Attorney, Agent, or Firm* — Saunders Mckeon PLLC

(57)     ABSTRACT

A method and apparatus for when utility power is restored after a period of running on a backup generator, inhibiting a transfer switch if the two sources are out of phase, monitoring the phase difference between utility power and the generator output, and changing from the generator to the utility feed when the two phases are sufficiently aligned.

10 Claims, 3 Drawing Sheets

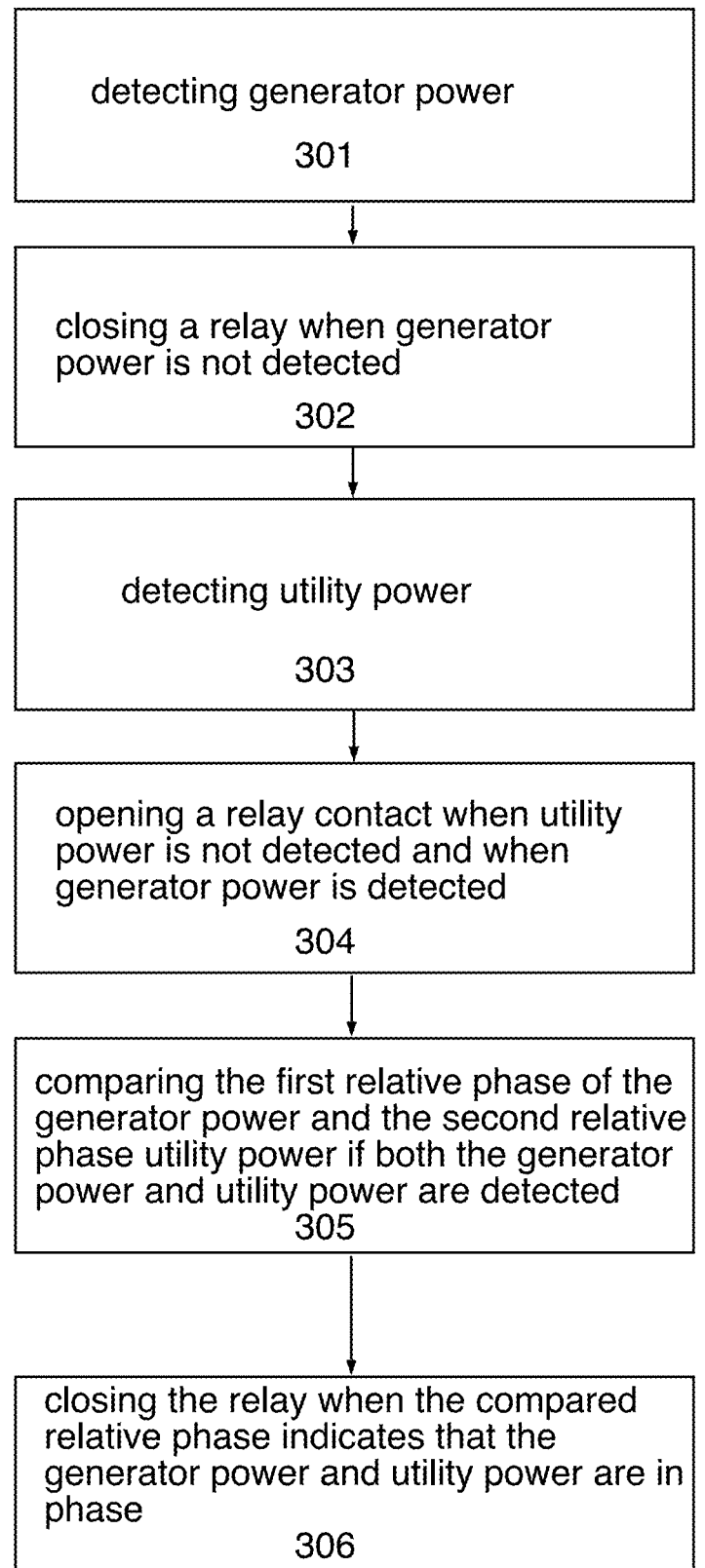

detecting generator power

301 closing a relay when generator power is not detected

302 detecting utility power

303 opening a relay contact when utility power is not detected and when generator power is detected

304 comparing the first relative phase of the generator power and the second relative phase utility power if both the generator power and utility power are detected

305 closing the relay when the compared relative phase indicates that the generator power and utility power are in phase

APPARATUS FOR PROTECTING MOTORS

RELATED APPLICATIONS

This application claims priority to U.S. Provisional Application No. 63/378,408, filed Oct. 5, 2023.

BACKGROUND

Stationary electrical loads such as lighting, appliances, heating, air conditioning, etcetera are normally powered by electricity from the "electric grid," a collection of generating stations, transmission lines, sub-stations, and related equipment. Occasionally, grid power becomes unavailable to a plurality of homes and buildings. One common cause of these outages is storms wherein high winds bring down overhead transmission lines.

Some homes and other buildings are equipped with standby or backup generators. These are commonly rotating electrical machines driven by internal combustion engines but, for purposes of this application, the term "backup generator" may also mean other electrical generating means used for this purpose including but not limited to solar panels, battery banks, and flywheel generators. Likewise, the role of the utility feed may be assumed by an alternative source such as a solar power system or other distributed generation means.

SUMMARY OF EXAMPLE EMBODIMENTS

An example embodiment may include an apparatus for protecting motors comprising electronics for monitoring a first AC voltage and a second AC voltage, wherein the electronics open a circuit when one of the two AC voltages is absent and closes the circuit when both voltages are present and in-phase. The electronics may protect the loads of an automatic transfer switch from a current surge that occurs when the transfer switch changes over from a first AC voltage to the second AC voltage. The electronics may include a microcontroller and a switch. The switch may be an electromechanical relay. The switch may be a solid-state thyristor. The electronics may include a discrete electronic components. The electronics may include integrated circuits.

An example embodiment may include an apparatus for protecting motors comprising a microcontroller with at least three input/output connectors, a transformer isolating a generator power output having a first instantaneous voltage and outputting a first sample output that is provided to the first input connector, an external power output having a second instantaneous voltage and provided to the second input connector, wherein the first sample output is isolated from the second output, and a third output from the microcontroller coupled to a first switch that interrupts, upon a signal by the microcontroller, a solenoid of an automatic transfer switch that switches power from the generator power output and the external power output. The first sample voltage may be provided via a transformer. It may include a MOSFET transistor that amplifies the signal of the third output to drive the first switch. The first switch may be a bidirectional, three electrode AC switch. The first switch may be a silicon controlled rectifier.

An example embodiment may include a method for using a microcontroller to protect motors comprising detecting generator power, closing a relay when generator power is not detected, detecting utility power, opening a relay contact when utility power is not detected and when generator power is detected, comparing the relative phase of the generator power and the utility power if both the generator power and utility power are detected, and closing the relay when the compared relative phase indicates that the generator power and utility power are in phase. The microcontroller may energize the relay coil to open the contact.

An example embodiment may include a method for restoring utility power comprising monitoring a first instantaneous voltage of a backup generator, monitoring a second instantaneous voltage of a utility feed, interrupting the transfer of power from the backup generator to the utility feed if the phase of the first instantaneous voltage does not match the second frequency, and transferring power from the backup generator to the utility when the phase of the first instantaneous voltage does match that of the second instantaneous voltage. It may include activating a backup generator when the utility power is deactivated. It may further include deactivating the backup generator when the power is transferred from the backup generator to the utility.

BRIEF DESCRIPTION OF THE DRAWINGS

For a thorough understanding of the example embodiments, reference is made to the following detailed description of the embodiments, taken in conjunction with the accompanying drawings in which reference numbers designate like or similar elements throughout the several figures of the drawing. Briefly:

FIG. 3 is a flowchart of an example embodiment of an automatic transfer switch.

DETAILED DESCRIPTION OF THE EXAMPLE EMBODIMENTS

Figure 1:
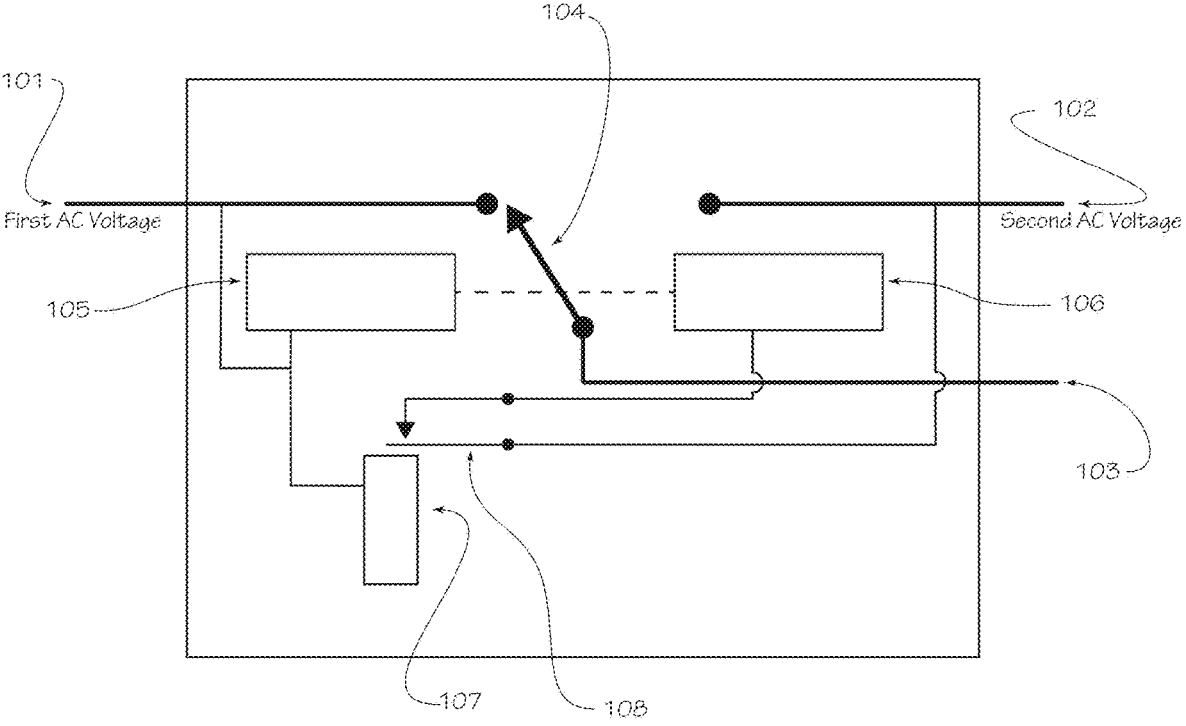
FIG. 1 is a diagram of an automatic transfer switch per the present art.

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

When utility power fails, the loads are without power until the generator can start and the transfer switch can change from utility to generator. This interval is typically a few tens of seconds in small systems such as residential installations but may be as much as minutes in larger installations. Either way, the outage is long enough that air conditioning compressors and other motors have time to stop and compressor restart timers get triggered. Therefore, the transfer from utility to generator is generally safe for air conditioning compressors and other rotating equipment.

But when the utility power is restored, the generator is already running. When the transfer switch cuts back to utility power, there is not a power-off period such as there is in the utility-to-generator case. There is only a very brief outage due to the break-before-make design of the transfer switch. This is commonly a few tens of milliseconds. Because the generator and utility are not synchronized, their respective sinusoidal voltages may be significantly out of phase when the transfer occurs. This means that there is a sudden transition from the instantaneous generator voltage to the instantaneous utility voltage rather than the continuous, smooth, sinusoidal change that motors are designed for. In the extreme, this can be a step-change of hundreds of volts.

The current through an inductance, such as a motor winding, is proportional to the rate of change of the voltage imposed across it. The normal sinusoidal voltage waveform of AC line power gradually rises and falls over a period of 16 to 20 milliseconds.

The nearly-instantaneous change in voltage that can occur when the loads transfer from the generator to the utility therefore creates a very high current surge in inductances including motor windings. In theory, an instantaneous voltage change results in an infinite current flow but, of course, it is not infinite in a real system. It can be, however, many times higher than the normal operating current of motors and other inductive loads. The surge can reach thousands of amperes for a few milliseconds. This can be enough to damage running motors and associated electrical components such as capacitors. In a residential application, the motors most likely to be running at any given time are refrigeration and air conditioning compressors. Those experienced with backup generators will have seen many instances of air conditioning compressors having to be replaced after a power outage that resulted in transfer to a generator and back.

When utility power is restored after a period of running on the generator, an embodiment of the invention inhibits the transfer switch if the two sources are out of phase. Since the generator and utility are not synchronized, the two sources drift into and out of phase constantly. The embodiment monitors the phase difference between utility power and the generator output. Once it sees that the two sources are in phase, it allows the transfer switch to change from generator to utility. The worst-case wait time for synchronization is the reciprocal of the difference in frequency between the generator and the utility. In practice, this is typically a few seconds.

Whatever the generation means, the loads, generator, and utility feed are interconnected with an automatic transfer switch. This switch comprises an electrical switch with two or more poles. FIG. 1 is a diagram of an automatic transfer switch. The switch 104 is so disposed that it either connects the loads to the utility feed 101 or to the generator output 102 but does not interconnect the generator output and the utility feed. The switch is equipped with two electrical solenoids. The first solenoid 105 is linked to pull the switch 104 to the utility-fed position and the second solenoid 106 to pull the switch 104 to the generator-supplied position. During normal operation when utility power is available, the switch is in the utility position and the generator output is disconnected from the loads. In order to avoid even brief connection between the utility and the generator, the switch is designed to "break before make" meaning that when it changes position, it first disconnects the one source from the load terminals before connecting the other source.

When the utility power source fails, the generator will automatically start. The power then coming from the generator then operates the second electrical solenoid 106 which changes the position of the transfer switch to disconnect the utility from the loads and connect the generator to the loads.

When utility power is restored, the first solenoid 105 is energized by power from the utility and it moves the transfer switch back to the utility position. The generator can now shut down although it is common for engine-driven generators to continue to run for a few minutes to cool down.

Some means, commonly an electromagnetic relay 107, prevents both solenoids from being energized at the same time. The way the relay is wired determines which of the two inputs to the transfer switch is prioritized if both sources are active. In the example illustrated in FIG. 1, the utility power input 105 has priority over the generator input. When utility power is present, it energizes the relay coil 107 and this opens contacts 108. The open contacts prevent electrical current from the generator input 102 from reaching the second solenoid coil 106. Thus, when utility power is restored, it can energize the first solenoid without interference from the second solenoid which, without the relay, would still be energized.

Figure 2:
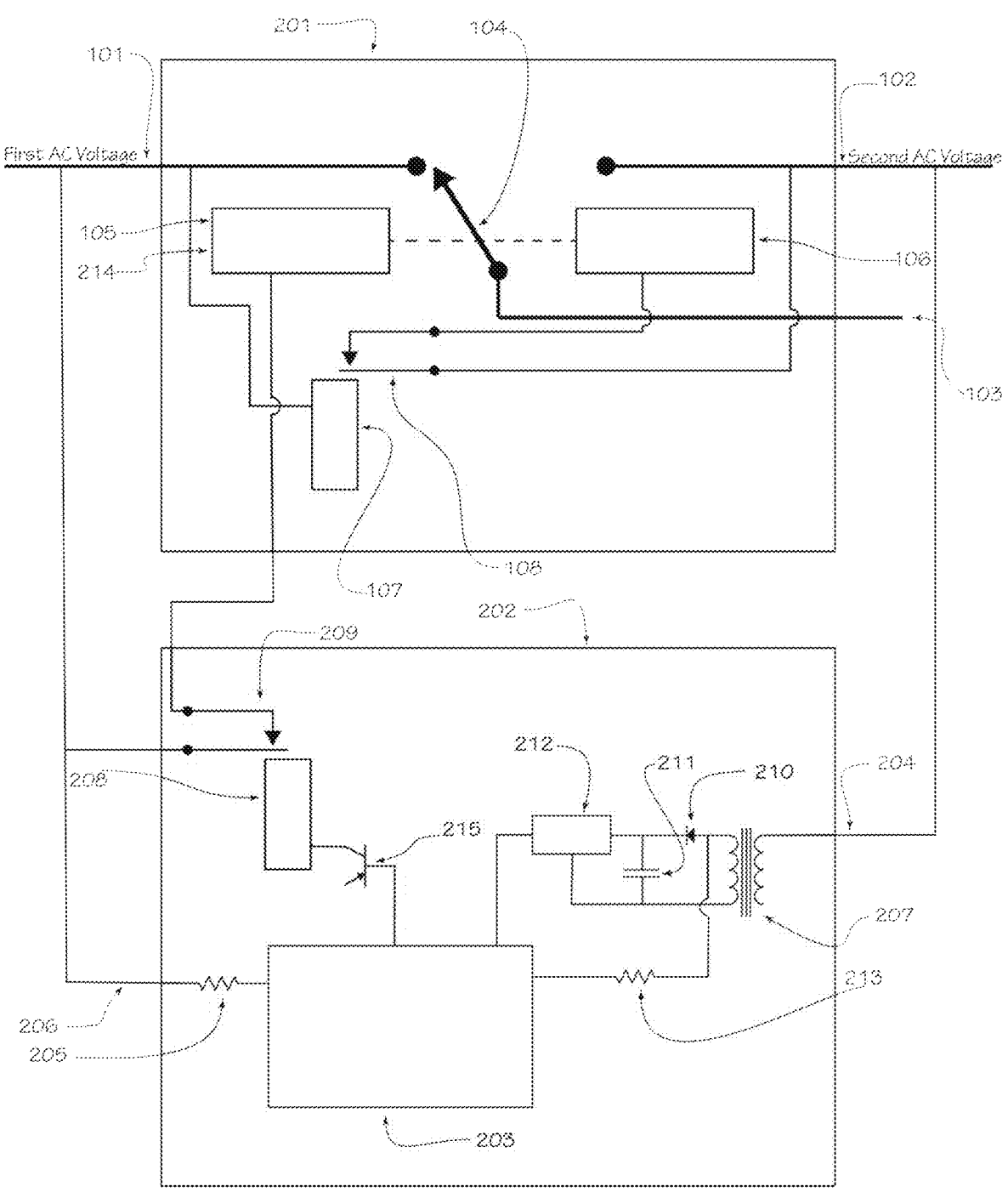
FIG. 2 is a diagram of an automatic transfer switch with an embodiment of the invention.

Example embodiments include a microcontroller and ancillary circuitry. FIG. 2 is a diagram of an automatic transfer switch 201 to which an embodiment 202 of the invention has been added.

An example embodiment is built around microcontroller 203 which implements the control logic. Almost any modern microcontroller is fast enough for the purpose and only needs to have three input/output connections. Microchip Technologies, ST Microelectronics, Texas Instruments, NXP, and other companies make a plethora of suitable microcontrollers. Choices include the ATTINY10 or PIC16F152 8-bit microcontrollers made by Microchip Technologies. An alternate embodiment could use discrete circuitry, a custom integrated circuit, or an FPGA instead of a microcontroller but these alternatives are unlikely to be more economical than a microcontroller.

The microcontroller must be able to measure the phase relationship between the utility power and the generator output. To perform this function, it must have samples of those two signals presented to inputs. They need not be analog-to-digital converters. Digital on/off inputs, known in the art as "GPIO," will suffice. The microcontroller firmware can measure the time between one input changing to the other input changing in the same direction. When this time is at a minimum, the two sources are synchronized. Alternatively, the input voltages can be measured by analog-to-digital converters (ADCs) and the phase difference measured by multiplying analog values representing the two voltages and enabling the transfer when this product peaks.

Input 204 connects to the output of the generator and input 206 connects to the utility power. Resistor 205 limits the current from the utility voltage to a level the microcontroller can tolerate. It is important that these two sources be isolated from one another. The example embodiment uses a small transformer, 207, to isolate the generator power from the rest of the circuit. The relay 208 isolates the output contacts from the rest of the circuitry. It is not necessary to further isolate the utility input since it is mutually isolated from the generator and the relay contacts 209. An alternate embodiment could use an opto-coupler for isolation. The transformer may consume less power and serves as part of the power supply for the microcontroller. The opto-coupler could be less expensive than a transformer but an alternate means of powering the microcontroller would be required.

The secondary voltage of the transformer is low, in the range of 5 to 10 volts. In the example embodiment, this voltage is rectified by diode 210 and the resulting half-wave voltage is filtered by capacitor 211 and this essentially continuous DC voltage is then regulated and limited by voltage regulator 212 to a voltage suitable for the microcontroller. This will typically be 3.3 or 5 volts. The generic 78L33, made by numerous manufacturers including ST Microelectronics and Texas Instruments is suitable.

Resistor 213 feeds a sample of the AC voltage at the transformer secondary to an input on the microcontroller and limits the current to a level compatible with the microcontroller.

Relay 208 has contacts, 209, which are disposed to interrupt the connection to the coil of the generator-to-utility solenoid 214 of an automatic transfer switch 201 and the original wiring of the transfer switch. The normally closed contacts are used so the transfer switch is able to move to the utility position if the generator is not running at all and thus the circuitry of the embodiment cannot operate. For example, the generator might run out of fuel during an extended power outage. Many relays are available which are suitable for the purpose. The Omron GLE-5 type relay or any of its many imitations is well suited for an embodiment of the invention.

The microcontroller controls the coil voltage of relay 208 so the logic implemented by the microcontroller program can open or close the contacts 209. Most microcontrollers cannot supply enough current to operate an inexpensive relay so a transistor, 215, is used to amplify the small current from the microcontroller to a level sufficient to operate the relay. A bipolar or MOSFET transistor will work. A bipolar device is typically less expensive. An alternate embodiment could use a microcontroller with a stronger output and/or a relay with a more sensitive coil. An alternate embodiment could use a solid-state device such as a triac or SCR in place of the relay. The relay is low-cost, rugged, and intrinsically provides galvanic isolation.

Control Logic may include the microcontroller's firmware program or hard-wired discrete circuitry implementing the following logic: (1) If the generator power is not present, then the relay contacts shall be closed. In the example embodiment shown in FIG. 3, this is ensured by powering the microcontroller and the relay from the generator output and using a relay with "normally closed" 302 contacts (SPST, NC) or using the normally closed contacts of a relay that has more than two contacts (SPDT, DPDT). (2) If the generator power is detected 301 but utility power is absent, the relay contacts shall be opened 304, preventing the transfer switch from moving to the utility position. In the example embodiment, the microcontroller energizes the relay coil to open the contacts. (3) If both generator and utility power are detected 303, and the relay contacts are open, then monitor the relative phase of the two power inputs. (4) Once the two inputs are determined to be in-phase 305, close the relay contacts by de-energizing the coil 306.

Although the example embodiments have been described in terms of embodiments which are set forth in detail, it should be understood that this is by illustration only and that the example embodiments are not necessarily limited thereto. The alternative embodiments and operating techniques will become apparent to those of ordinary skill in the art in view of the present disclosure. Accordingly, modifications of the example embodiments are contemplated which may be made without departing from the spirit of the claimed example embodiments.

What is claimed is:

1. An apparatus for protecting motors comprising:
   a microcontroller with at least three input/output connectors;
   a transformer isolating a generator power output having a first instantaneous voltage and outputting a first sample output that is provided to the first input connector;
   an external power output having a second instantaneous voltage and provided to the second input connector, wherein the first sample output is isolated from the second output;
   a third output from the microcontroller coupled to a first switch that interrupts, upon a signal by the microcontroller, a solenoid of an automatic transfer switch that switches power from the generator power output and the external power output.

2. The apparatus for protecting motors of claim 1, wherein the first sample voltage is provided via a transformer.

3. The apparatus for protecting motors of claim 1, further comprising a MOSFET transistor that amplifies the signal of the third output to drive the first switch.

4. The apparatus for protecting motors of claim 1, wherein the first switch is a bidirectional, three electrode AC switch.

5. The apparatus for protecting motors of claim 1, wherein the first switch is a silicon controlled rectifier.

6. A method for using a microcontroller to protect motors comprising:
   detecting generator power, wherein the generator power has a first relative phase;
   closing a relay when generator power is not detected;
   detecting utility power, wherein the utility power has a second relative phase;
   opening a relay contact when utility power is not detected and when generator power is detected;
   comparing the first relative phase of the generator power and the second relative phase utility power if both the generator power and utility power are detected;
   closing the relay when the compared relative phase indicates that the generator power and utility power are in phase.

7. The method for using a microcontroller to protect motors of claim 6, wherein the microcontroller energizes a relay coil to open a contact.

8. A method for restoring utility power comprising:
   monitoring a first instantaneous voltage of a backup generator;
   monitoring a second instantaneous voltage of a utility feed;
   interrupting a transfer of power from the backup generator to the utility feed if a phase of the first instantaneous voltage does not match a second frequency;
   transferring power from the backup generator to the utility when the phase of the first instantaneous voltage does match that of the second instantaneous voltage.

9. The method for restoring utility power of claim 8 further comprising activating a backup generator when the utility power is deactivated.

10. The method for restoring utility power of claim 9 further comprising deactivating the backup generator when the power is transferred from the backup generator to the utility.

* * * * *